Patented Aug. 19, 1930

1,773,445

UNITED STATES PATENT OFFICE

BENJAMIN W. BULLEN, OF NEW YORK, AND FREDRICK J. WALLACE, OF AU SABLE FORKS, NEW YORK, ASSIGNORS TO ROBESON PROCESS COMPANY, OF NEW YORK, N. Y., A CORPORATION OF NEW JERSEY

ELECTRIC CELL

No Drawing. Application filed April 2, 1927. Serial No. 180,609.

This invention relates to electric cells; and it comprises an electric cell provided with a positive and a negative electrode and with an electrolyte, said electrolyte being gelatinized or rendered pasty by the presence therein of concentrated waste liquors originating in the making of paper pulp; these waste liquors usually originating from the sulfite process of making paper pulp, although liquors from the soda process may also be used; the electrolyte used being often alkaline in its nature; all as more fully hereinafter set forth and as claimed.

"Dry cells" differ from other electric cells in that the electrolyte is immobilized in some way; usually by gelatinization with starch. Sawdust and many other absorbent solids have been proposed but are not now in use. Gelatinized electrolytes are practically only used in the Leclanche type of cell; a cell having a zinc pole and a carbon pole with manganese dioxid as a depolarizer. In this type of cell, the electrolyte is a solution of ammonium chlorid. Zinc chlorid is formed by the action of the cell and some is usually added to the electrolyte ab initio. All commercial dry B-battery cells and flash light cells are of this type. Starch is the best and, in fact, the only gelatinizing agent which has been found practical for these cells; but starch is not entirely satisfactory, the life of the cell being usually ended when the gelatinized electrolyte goes bad. Nor has starch been found applicable to any other type of electrolyte than that of the Leclanche cell though it has been occasionally proposed.

There are however various other types of cells in which a gelatinizing agent would be desirable; and in particular the Lalande type, in which the electrolyte is caustic soda solution (more rarely, caustic potash), and the poles are respectively zinc and copper oxid. Starch has not been found satisfactory for gelatinizing the electrolyte of these cells and nothing else has been found applicable.

We have found that concentrated waste liquors resulting from the production of wood pulp are efficient agents for gelatinizing electrolytes in various types of cell. In the Leclanche type cell, these gelatinizing agents give an electrolyte of longer life and good electrical properties. In the other type of cell, they are equally applicable, giving a good gelatinization of caustic alkali solutions and not disturbing the action of the cell or shortening its open circuit life.

In the manufacture of paper pulp, it is common to digest the chipped wood with either a solution of caustic soda or one of acid calcium sulfite. In either case, about half the wood dissolves, while the remaining half forms the paper pulp. The dissolved bodies are those important in the present invention.

In the waste liquor from the soda process, the so-called black liquor, the bodies in question are in combination with the soda, while in the waste sulfite liquor they very likely exist as the so-called lignosulfonic acids, forming salts with the bases present. In addition to these bodies which formed part of the original fiber, there are various other bodies present; resins, sugars, etc. Their exact nature is not here important. In black liquor there is caustic alkali which is available for use in making electrolyte. The ratio of organic matter to alkali however is commonly too high and we ordinarily contemplate adding further alkali to the black liquor solution. For example, in making an electrolyte for Lalande type cells, to 1000 parts by weight of concentrated black liquor as it comes from the evaporators there may be added 250 parts by weight of a 40 per cent caustic soda solution. The mixture is boiled until a sample on cooling will gelatinize. It is then suitable as an electrolyte. For Leclanche type cells, the black liquor is not directly applicable because of its alkalinity and we generally employ sulfite waste liquor. Sulfite waste liquor is also applicable to the alkaline type of cell and they have the further advantage that it is commercially available, both in the form of 30° Beaumé concentrates and dry concentrates. The dry concentrates are better adapted for the present purposes. Dry concentrated material may be directly added to an electrolyte solution until a pasty mass results. The electrolyte may be a solution of caustic soda or a solution of sal ammoniac with or without zinc chlorid. Or in making the electrolyte for Leclanche type cells dry sal ammoniac and zinc chlorid may be directly dissolved in the 30° Beaumé commercial concentrated sulfite liquor. This 30° Beaumé liquid can also be used in making pasty alkaline electrolytes; but in adding solid caustic soda to it some care is required to prevent local decomposition of organic matter at the point of addition. It is usually better to add the alkali as a solution as mixing is easier; reconcentrating after admixture if this be necessary. For example, to 1000 parts by weight of a 32° Beaumé liquid may be added 500 parts of a 40 per cent caustic soda solution and the mixture evaporated until gelatinization takes place. This gives an electrolyte of about 20 per cent soda content. Alternatively, to 1000 parts of a 40 per cent solution of caustic soda may be added 1000 parts of dry powdered commercial waste sulfite liquor. This sulfite liquor dissolves with some evolution of heat. A further small amount of water may be added to the mass and the whole heated until gelatinization takes place. There may be some concentration during the heating. The final product is a pasty mass with a caustic soda content of about 20 per cent.

The particular way in which the sulfite waste liquor preparations are obtained is not very material; it is the characteristic organic matters present which are here desirable. The sulfites existing as such, the lime, the sugars, etc. may or may not be removed by suitable methods of treatment. The best material we found however is that which is made by neutralizing raw sulfite waste liquor with lime and evaporating in vacuo to the desired consistency; either to a 30° liquid (which contains about 50 per cent solids) or to a dry state. Or evaporation may be to an intermediate concentration, say 32–33° Beaumé; the liquid being evaporated to this point, a solution of caustic soda or other electrolyte added and evaporation continued until the desired concentration is obtained.

To recapitulate, we find that the characteristic dissolved solids of paper pulp liquors are useful in gelatinizing electrolytes of all types of cells, whether the electrolyte be acid, neutral or alkaline; that in the Leclanche type of cell they possess certain advantages over the usual agent (starch) and in the case of alkaline electrolytes, they furnish the satisfactory gelatinizing agent hitherto lacking to the art. While we have described more particularly their use with Lalande type cells which are primary cells, they are, as a matter of fact, quite as useful with the alkaline electrolytes of the nickel iron type of storage cell. This electrolyte is ordinarily a solution of caustic potash, sometimes containing a little caustic lithia.

While either black liquor solids or sulfite waste liquor solids can be used, we find the sulfite waste liquor solids more generally useful. They usually give better results. For alkaline electrolytes however the alkali content of black liquor represents an important economy.

What we claim is:—

1. An electrolytic cell having an electrolyte gelatinized by a concentrated paper pulp digestor waste liquor.

2. An electrolytic cell having an electrolyte gelatinized by concentrated sulfite waste liquor.

3. An electric cell having an alkaline electrolyte gelatinized by a concentrated paper pulp digestor waste liquor.

4. An electric cell having an alkaline electrolyte gelatinized by concentrated sulfite waste liquor.

5. A primary cell of the Lalande type having a zinc pole and using copper oxid as a depolarizer, the electrolyte of said cell being a solution of caustic alkali gelatinized by a concentrated paper pulp digester waste liquor.

6. A primary cell of the Lalande type having a zinc pole and using copper oxid as a depolarizer, the electrolyte of said cell being a solution of caustic alkali gelatinized by concentrated sulfite waste liquor.

In witness whereof we have hereunto affixed our signatures.

BENJAMIN W. BULLEN.
FREDRICK J. WALLACE.